Figure 1:
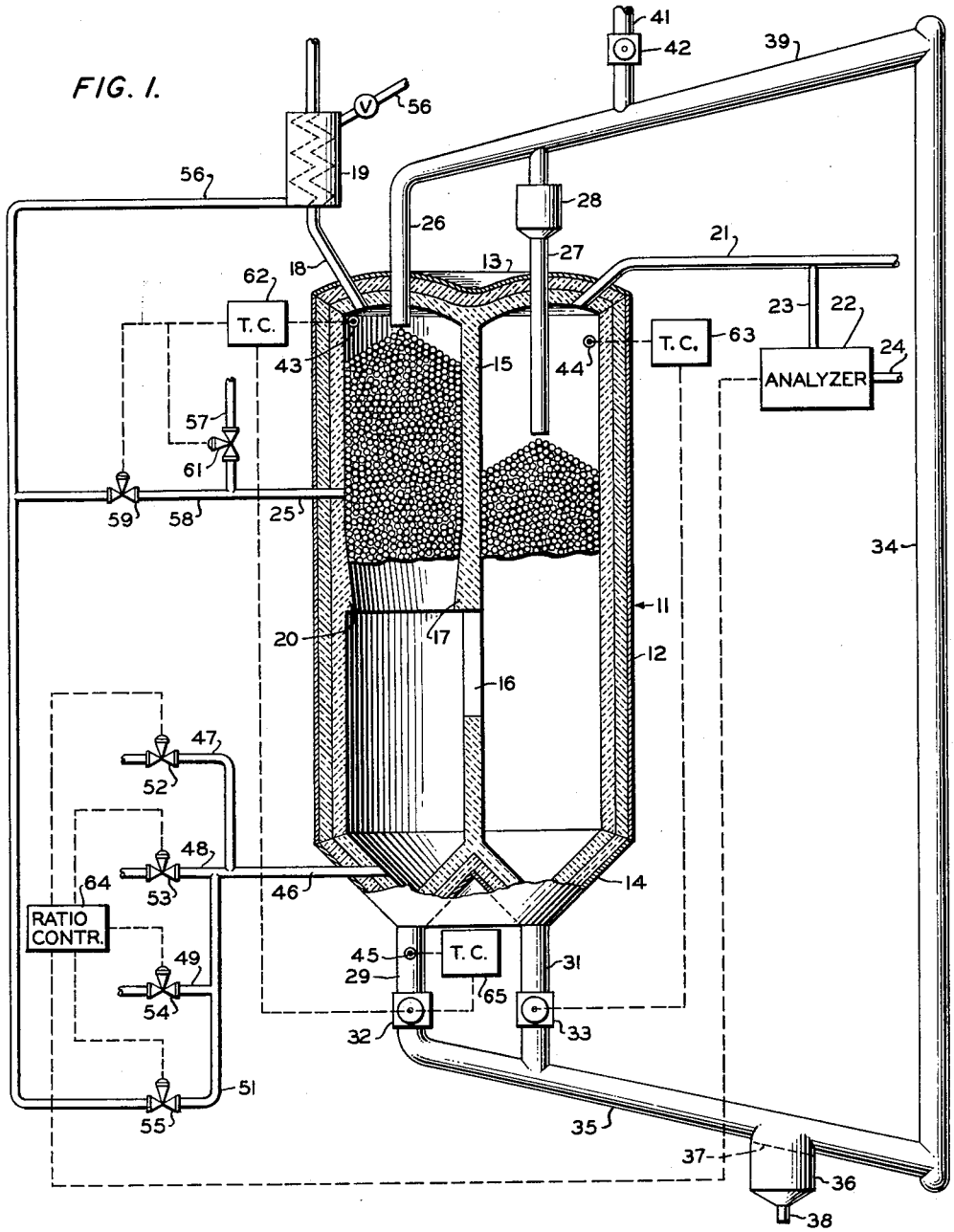

May 23, 1961     L. C. BEARER     2,985,525
PROCESS FOR PRODUCING A FUEL GAS

Filed March 9, 1956     2 Sheets-Sheet 1

INVENTOR.
L. C. BEARER
BY
Hudson & Young
ATTORNEYS

May 23, 1961 L. C. BEARER 2,985,525
PROCESS FOR PRODUCING A FUEL GAS
Filed March 9, 1956 2 Sheets-Sheet 2

INVENTOR.
L. C. BEARER
BY
Hudson • Young
ATTORNEYS

United States Patent Office 2,985,525
Patented May 23, 1961

2,985,525
PROCESS FOR PRODUCING A FUEL GAS
Louis C. Bearer, Waco, Tex., assignor to Phillips Petroleum Company, a corporation of Delaware
Filed Mar. 9, 1956, Ser. No. 570,641
9 Claims. (Cl. 48—196)

This invention relates to pebble heat exchangers. In one of its more specific aspects, it relates to a single shell pebble heater apparatus. In another of its more specific aspects, it relates to pebble heater apparatus having an internal quench. In another of its more specific aspects, it relates to an improved method for producing gaseous products in processes requiring close temperature control. In another of its more specific aspects, it relates to a method for producing city gases by means of the water-gas shift reaction.

Apparatus of the so-called "pebble heater" type has been utilized in recent years for the purpose of heating fluid to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene, acetylene, and water-gas, as well as for other reactions and purposes. Conventional pebble heater type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the entire length of the system, and are then conveyed to the top of the system to complete the cycle. Solid heat exchange material which is conventionally used in pebble heater apparatus is generally called "pebbles." The term "pebble" as used herein denotes any strong solid material of flowable size and form which is suitable to carry large amounts of heat from the pebble heating zone to the gas heating zone without rapid deterioration or substantial breaking. Pebbles conventionally used in pebble heater apparatus are ordinarily substantially spherical in shape and range from about 1/8 inch to about one inch in diameter. In a high temperature process, pebbles having a diameter of between 1/4-inch and 3/8-inch are preferred. Generally the pebbles must be formed of a refractory material which will withstand temperatures at least as high as the highest temperature attained in the pebble heating chamber. The pebbles must also be capable of withstanding temperature changes within the apparatus. Refractory material, such as metal alloys, ceramics, or other satisfactory material may be utilized to form such pebbles. Silicon carbide, alumina, periclase, beryllia, Stellite, zirconia and mullite may be satisfactorily used to form such pebbles or may be used in admixture with each other or with other materials. Pebbles formed of such materials, when properly fired, serve very well at high temperatures, some withstanding temperatures up to 4000° F. Pebbles which are used may be either inert or catalytic as used in any selected process.

In carrying out a water-gas shift reaction for the preparation of city gas, it may be desirable to utilize coke pellets instead of the refractory metal or metal alloy pebbles designated above. Such coke pellets are utilized in one specific aspect of this invention.

In normal operation of conventional pebble heater apparatus, the pebbles are heated in one of the chambers (preferably the upper one) by direct heat exchange with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 100° F. to 200° F. below the highest temperature of the pebbles within the first chamber. In processes for the production of ethylene from light hydrocarbons such as ethane or propane, the pebble temperature in the reaction chamber is usually within the range of 1200° F. to 1800° F. For the production of acetylene by the pyrolysis of hydrocarbons, temperatures in the range of 1600° F. to 3000° F. are desirable.

One disadvantage of conventional pebble heater apparatus is that the degree of temperature control after reaction of the feed is not sufficient in many instances to prevent overcracking of the products. Another disadvantage of conventional pebble heater apparatus is that it is very difficult to maintain the throat structures between pebble heater chamber and the reaction chamber. The high temperatures at which the apparatus operates places considerable thermal stress upon the pebble throats with the result that the throats tend to become fractured after very short periods of operation. I have devised a means and method whereby these disadvantages inherent in conventional pebble heater apparatus, are substantially obviated.

By at least one aspect of this invention, at least one of the following objects of the invention is attained. An object of this invention is to provide improved means for thermally treating or reacting gaseous materials. Another object of the invention is to provide improved means for converting carbon (coke or coal) granules to city gases by means of the water-gas reaction. Another object of the invention is to provide means for obtaining closer temperature control of the products resulting from a pyrolysis of hydrocarbons in pebble heater apparatus. Other and further objects of the invention will be apparent upon study of the accompanying disclosure.

Broadly speaking, this invention resides in an improvement in the structure of pebble heat exchange apparatus by forming that apparatus so as to provide a pebble heating section, a reaction section and a quench section within a single shell. The improvement comprises the provision of an upright partition member extending from the top to the bottom of the shell so as to divide that shell into two adjacent chamber sections. Gaseous material conduits are provided in the partition intermediate its ends so as to provide communication between the two chambers. Pebble flow controls are provided so as to make possible a close control of the pebble flow through the pebble heater apparatus in accordance with temperature conditions therein. Control of the feed to the apparatus may also be obtained in accordance with an analysis of the product stream.

Figure 2:
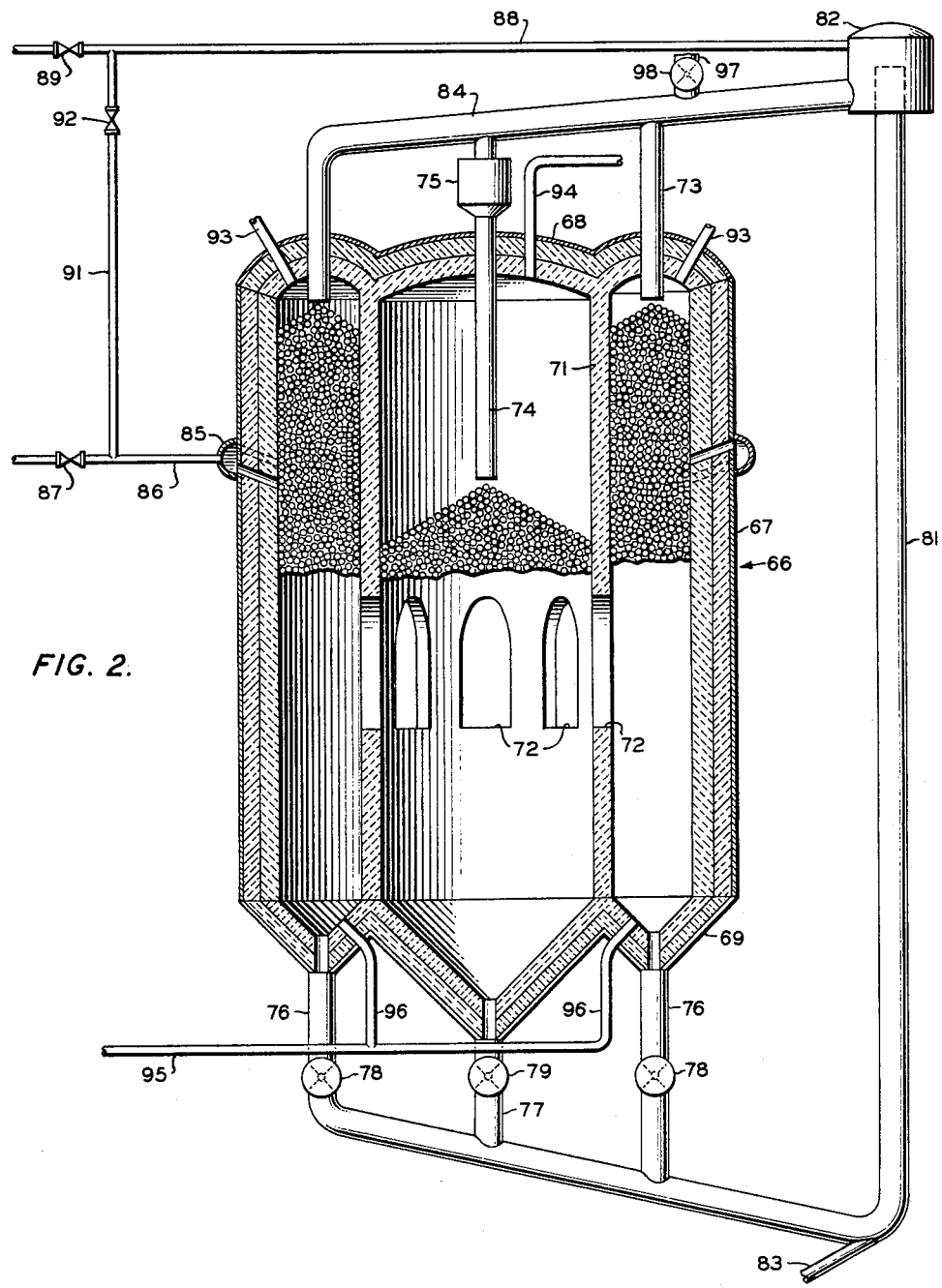

Better understanding of the invention will be apparent upon study of the diagrammatic drawings in which Figure 1 is a vertical section of the pebble heat exchanger of this invention. Figure 2 is a vertical section of pebble heater apparatus embodying a preferred modification of this invention.

Referring particlarly to the device shown in Figure 1 of the drawing, pebble heater apparatus 11 comprises a single upright shell 12 closed at its upper and lower ends by closure members 13 and 14, respectively. The chamber formed within shell 12 is divided into two sections by means of an upright partition member 15. Partition member 15 is provided with at least one gaseous material conduit 16 intermediate its ends, preferably in its central portion. In this specific modification of the invention a lip member 17 is provided as a portion of partition 15 so as to extend into one of the chambers formed within shell 12 and separated by partition member 15. A lip member 20 also extends into that chamber from the side wall. Gaseous effluent conduit 18 extends upwardly from the upper end portion of the chamber containing the extending lip 17 and preferably extends through indirect heat exchanger 19. Gaseous effluent conduit 21 extends from the upper end portion of the other chamber to a product collection zone, not shown. Aanlyzer 22 is connected to conduit 21 by means of conduit 23 and is provided with a gaseous effluent conduit 24 extending therefrom. Gaseous material inlet conduit 25 extends into the chamber containing lip member 17 at a point considerably above the bottom of that lip.

Pebble inlet conduit 26 extends into the upper end of the chamber containing lip members 17 and 20 and inlet conduit 27 extends into the upper end of the other chamber. Pebble surge chamber 28 is provided intermediate the ends of pebble conduit 27. Pebble outlet conduit 29 extends downwardly from the lower end of the chamber containing lip 17 and pebble outlet conduit 31 extends downwardly from the other chamber. Pebble feeder 32 is provided intermediate the ends of outlet conduit 29 and pebble feeder 33 is provided intermediate the ends of outlet conduit 31. Conduits 29 and 31 are connected at their downstream ends to the lower end of elevator 34 by means of conduit 35. Conduit 35 is provided with a separation chamber 36 having a grill or screen 37 in its upper side so as to form the floor in a section of conduit 35. Solid material outlet conduit 38 is provided in the lower end portion of separation chamber 36.

Elevator 34 is connected at its upper end to the upper ends of inlet conduits 26 and 27 by means of pebble conduit 39. Solid material inlet conduit 41, provided intermediate its ends with feeder 42, is connected to pebble conduit 39. Feeders 32, 33 and 42 may be any conventional type of pebble feeder such as a star valve, a gate valve, a rotatable table feeder, a vibratory feeder, or the like. A first temperature sensitive element 43 is provided in the upper end portion of the chamber containing lip members 17 and 20. Temperature sensitive element 44 is provided in the upper end portion of the other chamber. Temperature sensitive element 45 is provided in pebble outlet conduit 29. These temperature sensitive elements may be of any conventional type such as thermocouples or the like.

Gaseous material inlet conduit 46 extends into the lower end portion of the chamber containing lip members 17 and 20. Conduit 46 is branched, having inlets 47, 48, 49 and 51. Valves 52, 53, 54 and 55 are provided within the respective inlets. Feed conduit 56 is connected through indirect heat exchanger 19 and is connected to inlet 51 by means of valve 55. Gaseous material inlet conduit 25 is also branched having inlets 57 and 58. Inlet 58 is connected to conduit 56 through valve 59. Valve 61 is provided intermediate the ends of inlet 57. Temperature controller 62 is operatively connected to temperature sensitive element 43 and to valves 59 and 61. Temperature controller 62 is also operatively connected to pebble flow controller 32.

Temperature controller 63 is operatively connected to temperature sensitive element 44 and is connected to pebble flow controller 33 in pebble outlet conduit 31. Temperature controller 65 is operatively connected to temperature sensitive element 45 and is connected to pebble flow controller 32. Analyzer 22 is operatively connected to ratio controller 64 which is in turn operatively connected to valve members 52, 53, 54 and 55. Flow ratio controller 64 may be manually set so as to obtain the desired proportion of the various feeds within the reactor despite the requirement for volume change imposed by the signal from analyzer 22.

Referring particularly to the device shown in Figure 2 of the drawings, pebble heat exchanger 66 comprises an upright elongated shell 67 closed at its upper and lower ends by closure members 68 and 69, respectively. Refractory partition 71 is positioned coaxially with shell 67, being of smaller diameter than shell 67 and extending from the bottom closure 69 upwardly to closure member 68 so as to form an annular chamber between shell 67 and partition 71. Conduits 72 are provided in partition 71 intermediate its ends and preferably about midway between its upper and lower ends. Pebble inlet conduits 73 extend into the upper end portion of the annular chamber and pebble inlet conduit 74 extends into the upper end portion of the chamber formed within partition member 71. Pebble surge chamber 75 is provided intermediate the ends of pebble inlet conduit 74. A plurality of pebble outlet conduits 76 extend downwardly from the annular chamber and pebble outlet conduit 77 extends downwardly from the chamber formed within partition 71. Pebble feeders 78 are provided intermediate the ends of conduits 76 and pebble feeder 79 is provided intermediate the ends of pebble conduit 77. Elevator 81 is connected to the lower ends of pebble outlet conduits 76 and 77 and extends upwardly into separator chamber 82. A lift-gas inlet conduit 83 is provided in the lower end of elevator 81. The upper ends of pebble inlet conduits 73 and 74 are connected to the lower end portion of separator chamber 82 by pebble conduit 84.

A gaseous material inlet, preferably in the form of a header member communicates through shell 67 with the annular chamber at a point considerably above the level of conduits 72. That inlet header, designated by numeral 85, is connected to a gaseous material source by means of conduit 86 having valve 87 provided therein. Gaseous effluent conduit 88 extends from the upper end portion of separator chamber 82 and is provided with valve 89 therein. Conduit 91 extends between conduit 88 at a point upstream of valve 89 and conduit 86 at a point downstream of valve 89. Valve 92 is provided intermediate the ends of conduit 91. Gaseous effluent conduits 93 extend from the upper end portion of the annular chamber and gaseous effluent conduit 94 extends from the chamber formed within partition 71. Gaseous material inlet conduit 95 is connected to the lower end portion of the annular chamber by means of conduits 96. Pebble inlet conduit 97 is connected to pebble conduit 84 and is provided with pebble feeder 98 intermediate its ends.

The temperature controllers used in this invention can be any of the many such controllers conventionally used in industry. Exemplary of such devices is the one described by Bailey et al. in U.S. Patent 2,447,306. The pebble flow controllers can be either star valves, gate valves, rotating table feeders, vibratory feeders, or the like.

The device of this invention may be used in any of the processes for pyrolysis of hydrocarbons requiring a sharp control of product temperatures. One such process involves the cracking of hydrocarbon gases which are predominantly in the $C_3$ and $C_4$ range to form water-gas for commercial gas systems. When liquefied petroleum gas is converted to water-gas for commercial gas systems, it is economically desirable to waste as little of the products of the reaction as possible because of the relatively high cost of that gas. In conventional pyrolysis of hydrocarbon gases which are predominantly in the $C_3$ and $C_4$ range, temperatures which are ordinarily used are too low to produce a gas of the low heating value usually employed in established domestic gas systems. Such commercial gas systems usually require a gas having a heating value of between about 500 and 700 B.t.u./cubic foot and a relatively low specific gravity, such as below about 0.5 as compared to a value of 1.0 for air. As far as is known, conventional propane cracking procedures result in a product gas having a B.t.u. value per cubic foot of at least about 775 and a specific gravity of at least 0.386 as compared to a value of 1.0 for air. In order to produce a low specific gravity gas of the required B.t.u. rating, it is necessary to operate at sufficiently high temperatures to thoroughly crack and reform the primary decomposition products. Resulting products can be blended with other gaseous material so as to obtain a fuel of the desired B.t.u. and specific gravity. Considerably greater amounts of carbon are deposited on the solid materials at the higher temperatures than at the lower temperatures. In such a process, it is apparent that the recovery of all of the products of such a reaction is highly desirable. By the process of this invention the carbon which is formed during the cracking operation is converted to water-gas in a second pass through the system. Tars which are formed are deposited on the pebbles in a quench section and are converted to coke for use in the system.

The water-gas reaction is obtained by passing steam over coke which has been heated to incandescence but to a temperature below the ash fusion point. The apparatus described above is quite useful in the production of water-gas from either gaseous hydrocarbons or from carbon (coke or coal) granules. In the process for the production of water-gas in the apparatus of this invention, coke particles may be utilized as the gravitating pebble mass or one of the other pebbles described above may be used.

When gaseous hydrocarbons are cracked for this purpose, carbon is laid down upon the surface of those pebbles and while at a high temperature the coke-covered pebbles are contacted with steam and/or air to convert some of the carbon to CO and $CO_2$. Substantially the same procedure is used when utilizing coke particles. The following reactions take place upon passing steam over carbon at various temperature levels.

(1) $C + H_2O \rightarrow CO + H_2$
(2) $C + 2H_2O \rightarrow CO_2 + 2H_2$
(3) $CO + H_2O \rightarrow CO_2 + H_2$
(4) $CO_2 + C \rightarrow 2CO$ When steam is present during the thermal cracking of the hydrocarbon material, the above reactions are important along with reactions of hydrocarbons and steam. The reactions of methane and steam may be represented as follows:

(5) $CH_2 + H_2O \rightarrow CO + 3H_2$
(6) $CH_4 + 2H_2O \rightarrow CO_2 + 4H_2$ Although the Reaction 1 takes place below 1650° F., the velocity of the reaction at such temperatures is quite low. At temperatures above about 1650° F., however, the velocity of the reaction is relatively rapid. The velocity of Reaction 2 is rapid as compared to Reaction 1 up to a temperature of 1650° F., but above this temperature the reaction rates of (1) and (2) are about equal. The velocity of Reaction 4 is more than twice that of Reaction 1 at temperature above 1650° F.

In the operation of the device shown as Figure 1 of the drawings, carbon or other pebbles are introduced into the system through inlet conduit 41 and feeder 42. The pebbles gravitate through conduit 39 and inlet conduits 26 and 27 into the two chambers formed within shell 12 forming contiguous gravitating masses therein. Flow through the two chambers is controlled by pebble flow controllers 32 and 33 in outlet conduits 29 and 31, respectively. Pebble conduit 27 extends downwardly to a lower level in its chamber than does conduit 26. For that reason the level of solid material within the chamber connected to conduit 27 is considerably lower than that in the other chamber section. The solid material bed extends downwardly from a point above the level of conduits 16 to pebble feeder 33 in outlet conduit 31.

Fuel is introduced through conduit 57 to inlet 25 for start-up of the system or operation with refractory pebbles and free oxygen in the form of air and/or oxygen is introduced into the one chamber through conduit 58 and inlet conduit 25. The pebbles are heated or the coke is oxidized to such an extent that it is heated to incandescence but only to a temperature below the ash fusion temperature. If pebbles other than coke are used, a gaseous fuel or hot gaseous material is introduced into the chamber as pointed out above. The fuel is burned in the presence of the pebbles. Hot gaseous heat exchange material passes upwardly through the contiguous pebble mass and is removed from the upper portion of the chamber through effluent outlet conduit 18 and is passed in indirect heat exchange with a stream of air so as to heat that material which is then used as a portion of the feed either to the heating section or to the reaction section or both. A hydrocarbon feed such as ethane and/or propane is introduced through conduit 47. Steam is introduced through conduit 48. Oxygen is introduced through conduit 49 and a limited opening valve 54 into inlet conduit 46 and thus into the lower portion of the reaction section within shell 12. Air is introduced through conduit 51 so as to augment the supply of free oxygen when desired.

The coke particles which are heated in the heating section above the reaction section gravitate through the reaction section in direct heat exchange with the gaseous feed to the reaction section. The hydrocarbons and the carbon are converted by means of the water-gas reaction and resulting products take the path of least resistance from the reaction zone. The path of least resistance is in the apparatus of this invention through conduit 16 and the mass of pebbles gravitating from conduit 27 through the quench section of the system. Considerably less pressure drop is encountered through the pebble mass in the quench section than is encountered in the heating section for the reason that the pebble bed in the quench section above the level of conduit 16 is of considerably less thickness than that in the heating section and because of the back pressure of the gases introduced at inlet conduit 25. The water-gas shift reaction takes place until finally quenched by the cool pebbles within the quench section.

The resulting reaction products are removed from the upper portion of the quench chamber through effluent outlet conduit 21 and are passed to a product collection zone not shown. A portion of the product stream is withdrawn to analyzer 22 and the materials are analyzed thereby. Valves 52, 53, 54 and 55 are controlled in accordance with the analysis of the product stream and the predetermined flow ratio imposed by ratio controller 64 so as to maintain a proper flow of reactant materials into the lower portion of the reaction zone.

Temperature sensitive element 44 is contacted by the gaseous effluent leaving the quench section and a signal is transmitted from that temperature sensitive element to temperature controller 63. If the gaseous effluent is too hot, temperature controller 63 operates so as to increase the flow of pebbles through feeder 33 so as to increase the rate of pebble flow and concomitant cooling and if too cool, to decrease the flow of pebbles. If the stack gases from the pebble heating section are too hot, that fact is communicated by means of temperature sensitive element 43 to temperature controller 62. Temperature controller 62 operates to control the flow of oxygen and air or fuel or hot gas into inlet 25 through conduits 57 and 58 by actuating valves 61 and 59, respectively. If the stack gases are too hot, the amount of oxygen and air or other gaseous material is materially decreased so as to maintain the pebbles at a lower temperature. Temperature controller 62 also actuates feeder 32 so as to increase the flow of pebbles through conduit 29 when the temperature of the stack gases is too high or to decrease the flow of pebbles through that feeder when the temperature of the stack gases is too low.

Temperature controller 65 on outlet conduit 29 is sensitive to the temperature of the gravitating solids in that conduit and if the pebbles leaving the chamber are too hot, temperature controller 65 which is operatively connected to temperature sensitive element 45 operates to decrease the pebble feed rate and when the pebbles are too cool, to increase the rate of pebble flow through feeder 32. Pebbles which are removed from the lower end of the chambers formed within shell 12 gravitate through conduit 35 over grid or screen 37 and ash is separated from the pebbles and is removed from chamber 36 through outlet conduit 38. The pebbles are elevated to the upper end of the system through elevator 34 and conduit 39.

While temperatures within the range of 1650° F. to 2500° F. are required in the reaction zone for the water-gas reaction, the preferred range of temperature in which the process operates most efficiently is within the range of 1900° F. to 2400° F. Temperatures of about 1750° F. to 2900° F. in the pebble heating zone will result in the desired temperature in the reaction zone. That temperature may be lowered, however, as air is introduced into the system.

In the operation of the device shown in Figure 2 of the drawings, the steps are much the same as those described in the description of the device of Figure 1. The solid heat exchange material is introduced into the system through inlet conduit 97 and feeder 98. The solid material gravitates into an annular heating zone and downwardly through a reaction zone. A portion of the solid heat exchange material is fed through pebble surge chamber 75 and conduit 74 into a quench zone formed within partition 71. The solid materials gravitate through feeders 78 and 79 and are entrained in a gaseous lift-medium which is suitable as the oxidizing or heating medium for introduction into the pebble heating zone. The solid heat exchange material is lifted by entrainment in the lift-gas to separator chamber 82, wherein the solid heat exchange material and the lift-gas are separated. The lift-gas which has been preheated in the elevating step is removed from separator chamber 82 through conduit 88. This gas can either be vented through valve 89 or passed to inlet means 85 through valve 92, conduit 91 and conduit 86. If additional air or other heating material is desired, that material can be introduced through valve 87 and conduit 86 into the heating section. Reactant materials are introduced into the lower portion of the annular chamber through conduits 95 and 96. The reaction and quenching steps take place in the manner described in connection with Figure 1.

The various automatic features described in connection with Figure 1 may also be used in connection with Figure 2. Although partition 71 and shell 67 have not been shown as having lips extending into the annular chamber, it is within the scope of this invention to so modify those members or to so modify partition member 15 and shell 12 to omit extended lips 17 and 20. The purpose of providing those lips is to increase the pressure drop and thus decrease the tendency of reaction products to flow into the heating section.

To illustrate several aspects of the invention without unduly or unnecessarily limiting the same, examples are presented below. In each case apparatus substantially as shown in Figure 1 is utilized for the particular process illustrated. Alumina pebbles ⅜" in diameter and pebble chambers of about 4 ft.² cross section are used. The pebble circulation rate is approximately 30,000#/hr.

*Example I*

This run illustrates operation on coke in which the pebbles are coated with coke to the extent of 4.75 weight percent on entering the reaction zone and 0.75 weight percent on leaving the quenching zone. The reaction zone temperature is in the range of about 1900–1950° F.

In order to produce 106 m.c.f. of gas per hour having the following composition:

| | Percent |
|---|---|
| $H_2$ | 56.6 |
| CO | 30.2 |
| $CO_2$ | 13.2 | and having a molecular weight of about 15.4 (removed thru conduit 21), the following feed is required:

2350# steam/hr. into conduit 48
1200# coke/hr. on pebbles

*Example II*

This run illustrates operation on coke-coated pebbles as in the preceding run but with addition of air. The reaction zone temperature is in the range of 2100 to 2150° F.

In order to produce 52 m.c.f. of gas per hour of the following composition:

| | Percent |
|---|---|
| CO | 61.0 |
| $H_2$ | 31.5 |
| $CO_2$ | 6.7 |
| $N_2$ | 0.8 |
| | 100.0 | and having a molecular weight of about 20.9 (removed thru conduit 21), the following feed is required:

11,600 ft.³ oxygen/hr. into conduit 49
825# steam/hr. into conduit 48
1,175# coke/hr. on pebbles The oxygen used contains nitrogen as an impurity to about 3.6 volume percent.

*Example III*

This run illustrates operation involving the pyrolysis of natural gas at a reaction temperature in the range of 2000–2050° F.

In order to produce 74 m.c.f. gas per hour having the following composition:

| Component: | Vol. percent |
|---|---|
| Illuminants | 2.4 |
| Carbon monoxide | 8.7 |
| Hydrogen | 33.8 |
| Methane | 35.9 |
| Carbon dioxide | 2.1 |
| Oxygen | 0.1 |
| Nitrogen | 17.0 |
| Total | 100.0 | and having a molecular weight of about 14.6 (removed thru conduit 21), the following feeds are required:

Air _____ 1.6 m.c.f./hour into conduit 51.
Steam _____ 453#/hour into conduit 48.
Natural gas _____ 41 m.c.f./hour into conduit 47.

The natural gas is first de-ethanized, and comprises primarily methane and nitrogen with small amounts of illuminants.

Other and further modifications will be apparent to those skilled in the art. Such modifications are believed to be within the spirit and scope of this invention.

This application is a continuation-in-part of my copending application S. N. 262,757, filed December 21, 1951, now U.S. Patent 2,769,693, issued November 6, 1956.

I claim:
1. A continuous method of forming fuel gas which comprises the steps of heating pebbles to incandescence but below their ash fusion temperature in a pebble heating zone; gravitating said heated pebbles directly to and thru a subjacent reaction zone contiguous to said heating zone, at least the surface of said pebbles in said reaction zone being formed of coke; introducing steam into the lower end portion of said reaction zone; converting at least a portion of said coke to water-gas by reaction with said steam in said reaction zone; forcing said products from the upper portion of said reaction zone directly into and thru a quench zone laterally contiguous to said reaction zone than thru said heating zone; gravitating a mass of a substantially lower level than in said heating zone so as to provide a lower pressure drop thru said quench zone and thru said heating zone; gravitating a mass of cool pebbles through said quench zone in direct heat exchange with said products, whereby said products are quenched; removing pebbles from the lower portion of said reaction and quench zones; and elevating said pebbles to said pebble heating and quench zones.

2. The method of claim 1 wherein said pebbles comprise coke granules.

3. The method of claim 2 wherein said pebbles are heated to a temperature within the range of 1750° F. to 2900° F.

4. The method of claim 1 wherein said pebbles have a coke-free refractory core coated with coke.

5. The process of claim 1 including the introduction of free oxygen into said reaction zone.

6. The process of claim 5 including the introduction of hydrocarbon in vapor form into said reaction zone.

7. The method of claim 1 wherein said quench zone is enclosed laterally by said reaction zone and reaction products are passed radially inwardly into said quench zone.

8. The continuous method of forming fuel gas which comprises the steps of heating pebbles to a temperature within the range of between 1750° F. and 2900° F. in a pebble heating zone; gravitating said heated pebbles into and through a reaction zone subjacent and contiguous to said heating zone as an uninterrupted mass; introducing a hydrocarbon material, free oxygen, and steam into the lower portion of said reaction zone and upwardly in direct heat exchange with said heated pebbles; reforming said hydrocarbon with said steam to form carbon monoxide and hydrogen; depositing carbon resulting from said reforming reaction on said pebbles in said reaction zone; converting said carbon to water-gas by reaction with said steam in said reaction zone; passing said products from the upper portion of said reaction zone directly into and through a contiguous quench zone; gravitating a mass of cool pebbles through said quench zone into direct heat exchange with said products, whereby said products are quenched; maintaining a higher pebble column above said reaction zone than in said quench zone above the entry of said products thereto so as to cause said products to pass through said quench zone, removing pebbles from the lower portion of said reaction and quench zones and elevating said pebbles to said pebble heating and quench zones.

9. A process for forming fuel gas which comprises maintaining a continuous gravitating column of pebbles, at least the surface of which comprises coke, extending uninterruptedly through an upper heating zone and a lower reaction zone; maintaining a gravitating column of cool pebbles in a laterally adjacent quench zone contiguous with first said column at the upper section of said reaction zone; passing a heating gas into a lower section of said heating zone so as to heat said pebbles to a temperature above water-gas reaction temperature in said reaction zone; passing a stream of gas comprising steam upwardly through said reaction zone so as to convert coke on said pebbles to water-gas; maintaining the level of pebbles in first said column substantially higher than the level of pebbles in said quench zone so as to maintain lower pressure through said quench zone and cause reaction zone effluent to pass thru said quench zone; and recovering the quenched effluent.

References Cited in the file of this patent

UNITED STATES PATENTS

| | | |
|---|---|---|
| 525,131 | Browne | Aug. 28, 1894 |
| 1,983,943 | Odell | Dec. 11, 1934 |
| 2,659,668 | Mayland | Nov. 17, 1953 |
| 2,681,273 | Odell | June 15, 1954 |
| 2,714,059 | Bearer | July 26, 1955 |

UNITED STATES PATENT OFFICE

CERTIFICATE OF CORRECTION

Patent No. 2,985,525            May 23, 1961

Louis C. Bearer

It is hereby certified that error appears in the above numbered patent requiring correction and that the said Letters Patent should read as corrected below.

Column 9, line 9, after "zone", first occurrence, strike out "than three said heating zone; gravitating a mass of" and insert instead -- by maintaining the pebbles in said quench zone at --; line 16, for "and" read -- than --; column 10, line 30, after "pressure" insert -- drop --.

Signed and sealed this 1st day of May 1962.

(SEAL)
Attest:

ERNEST W. SWIDER
Attesting Officer

DAVID L. LADD
Commissioner of Patents